United States Patent [19]

Fujita et al.

[11] Patent Number: 4,889,395

[45] Date of Patent: Dec. 26, 1989

[54] ANTI-LOCK CONTROL APPARATUS FOR AIR OVER HYDRAULIC BRAKE SYSTEM

[75] Inventors: Tomohiro Fujita, Hanyu; Ryuji Kawano, Kohnosu, both of Japan

[73] Assignee: Akebono Brake Industry Co., Ltd., Tokyo, Japan

[21] Appl. No.: 317,846

[22] Filed: Mar. 2, 1989

[30] Foreign Application Priority Data

Mar. 4, 1988 [JP] Japan .................. 63-51296

[51] Int. Cl.$^4$ .............................. B60T 8/42
[52] U.S. Cl. ............................. 303/115; 303/113
[58] Field of Search ............ 188/181 A; 303/103, 303/104, 113, 114, 115, 117, 119

[56] References Cited

U.S. PATENT DOCUMENTS 3,754,795  8/1973  Von Lowis et al. ............... 303/115
3,963,277  6/1976  Chiba ............................... 303/113

Primary Examiner—Duane A. Reger
Attorney, Agent, or Firm—Oliff & Berridge

[57] ABSTRACT

Disclosed is an anti-lock control apparatus for an air over hydraulic brake system having a first air pressure line leading from a brake valve to an air master cylinder as well as a second air pressure line branching from the first air pressure line and leading to a modulator. The second air pressure line is provided with an exhaust-side check value for exhausting air from a pneumatic chamber of the modulator and an air-supply side check valve for supplying air to the pneumatic chamber. The pneumatic chamber of the modulator and the second air pressure line are adapted to hold residual pressure, thereby increasing the rising gate of the braking hydraulic pressure during braking and the falling rate of the braking hydraulic pressure during release of braking, and reducing the amount of air consumed.

8 Claims, 3 Drawing Sheets

ANTI-LOCK CONTROL APPARATUS FOR AIR OVER HYDRAULIC BRAKE SYSTEM

BACKGROUND OF THE INVENTION

The present invention relates to an anti-lock control apparatus for an air over hydraulic brake system.

An anti-lock control apparatus for an air over hydraulic brake system is conventionally known, as shown in FIG. 4. This anti-lock control apparatus is arranged as follows: A brake valve 2 is connected to an air pressure source 1, while the brake valve 2 is connected to an pneumatic chamber 13 of an air master cylinder 10 through a first air pressure line 4. A hydraulic chamber 14 of the air master cylinder 10 is connected to a liquid input port 21 of a modulator 20, and a check valve is interposed in a passage between the liquid input port 21 of the modulator 20 and a liquid output port 22 thereof. This check valve is arranged such as to be capable of being opened by a hydraulic piston fitted in the modulator 20. A pneumatic piston is connected to the hydraulic piston, and the liquid output port 22 of the modulator 20 is communicated with the hydraulic chamber of the modulator 20 and is connected to a wheel cylinder 26. The pneumatic chamber of the modulator 20 is connected to the first air pressure line 4 via a hold valve 41 constituted by a normally open-type solenoid valve so as to form a second air pressure line 40. In addition, the pneumatic chamber of the modulator 20 is connected to an external part via a decay valve 42 constituted by a normally close-type solenoid valve. In addition, Japanese Patent Publication No. 1824/1976 (a Japanese application based on West German Patent No. 2040206.6) is known as another prior art.

With the control apparatus shown in FIG. 4, since the modulator 20 is provided for anti-lock control, the second air pressure line 40 branching off from the first air pressure line 4 and leading to the modulator 20 is required in addition to the first air pressure line 4 extending from the brake valve 2 to the air master cylinder 10. For this reason, there has been a drawback in that the internal volumes of the air pipes and the modulator 20 increase, with the result that the rising rate of the braking hydraulic pressure during braking and the falling rate of the braking hydraulic pressure during release of braking decrease, and that the amount of air consumed increases.

SUMMARY OF THE INVENTION

Accordingly, an object of the present invention is to provide an anti-lock control apparatus for an air over hydraulic brake system which is capable of increasing the rising rate of the braking hydraulic pressure during braking and the falling rate of the braking hydraulic pressure during release of braking, and reducing the amount of the air consumed.

To this end, according to the present invention, there is provided an anti-lock control apparatus for an air over hydraulic brake system wherein a brake valve is connected to an air pressure source, the brake valve is connected to a pneumatic chamber of an air master cylinder through a first air pressure line, a hydraulic chamber of the air master cylinder is connected to a liquid input port of a modulator, a valve device is interposed in a passage between the liquid input port of the modulator and a liquid output port thereof, the valve device is arranged such as to be capable of being opened by a hydraulic piston fitted in the modulator, a pneumatic piston is connected to the hydraulic piston, and the liquid output port of the modulator is communicated with a hydraulic chamber of the modulator and is connected to a wheel cylinder, a pneumatic chamber of the modulator is connected to a second air pressure line branching off from the first air pressure line and having a hold valve provided therein, and the pneumatic chamber of the modulator is connected to an external part via a decay valve, the anti-lock control apparatus comprising: an exhaust-side check valve provided in the second air pressure line and adapted to exhaust air from the pneumatic chamber of the modulator; and an air supply-side check valve provided in the second air pressure line and adapted to supply air to the pneumatic chamber of the modulator.

In accordance with the present invention, the pneumatic chamber of the modulator and the second air pressure line are capable of holding residual pressure.

DESCRIPTION OF THE PREFERRED EMBODIMENTS

Figure 1:
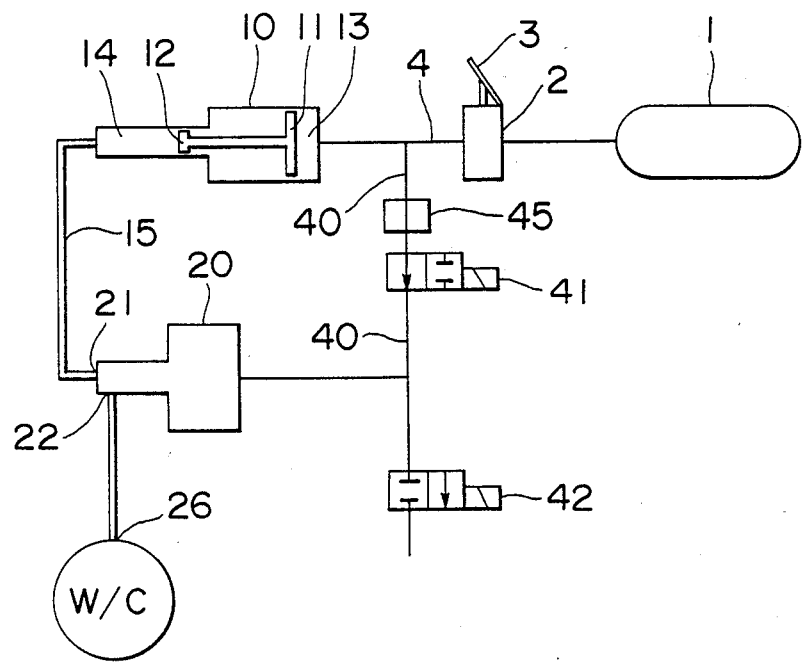
FIG. 1 is a systematic diagram of an anti-lock control apparatus for an air over hydraulic brake system in accordance with an embodiment of the present invention.
Figure 2:
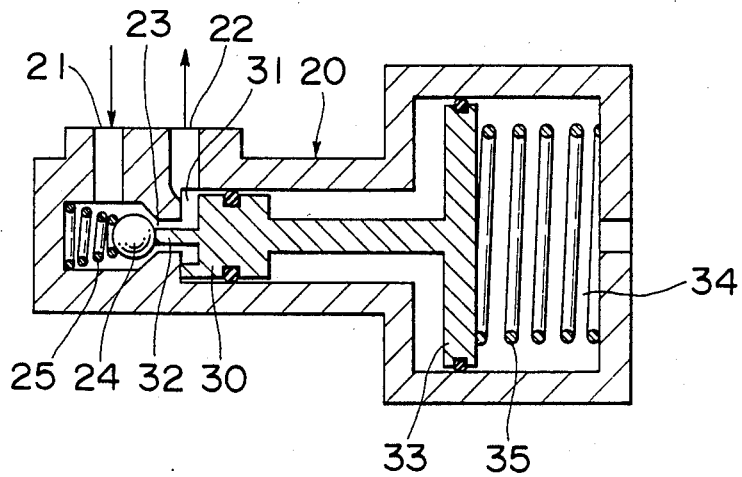
FIG. 2 is a cross-sectional view of a modulator thereof.
Figure 3:
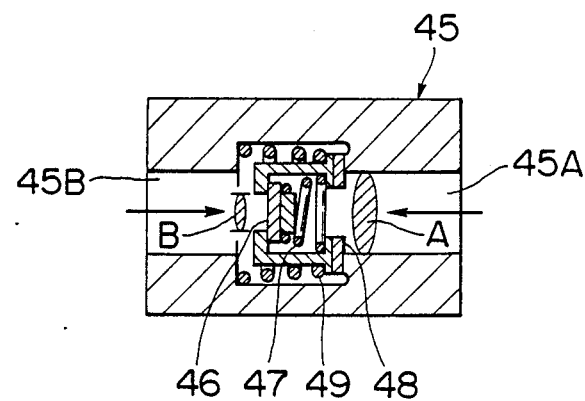
FIG. 3 is a cross-sectional view of a two-way check valve thereof.
Figure 4:
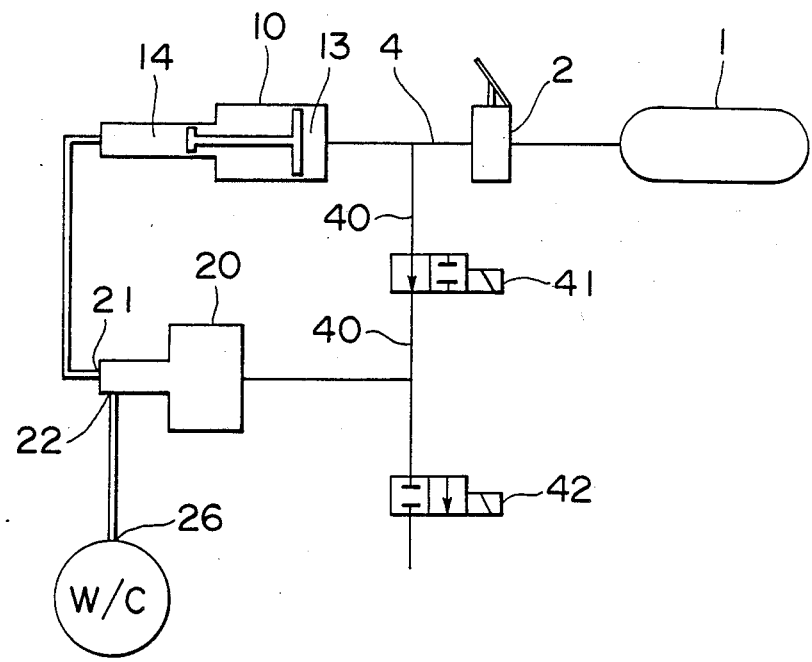
FIG. 4 is a systematic diagram of a conventional example.

FIGS. 1 to 3 illustrate an anti-lock control apparatus for an air over hydraulic brake system in accordance with an embodiment of the present invention. An air pressure source 1 formed as an air tank is connected to a brake valve 2 via an air pressure line, and the brake valve 2 is connected to a pneumatic chamber 13 of an air master cylinder 10 via a first air pressure line 4. A valve (not shown) is provided in parallel with the brake valve 2 so as to allow the first air pressure line 4 to communicate with the atmosphere when the brake valve 2 is closed.

A pneumatic piston 11 having a large diameter is fitted in the air master cylinder 10, and a hydraulic piston 12 having a small-diameter is axially connected to the pneumatic piston 11. A hydraulic chamber 14 of the air master cylinder 10 is connected to a liquid input port 21 of a modulator 20 via a hydraulic pressure line 15. A valve device 24 urged by a check valve spring 25 and formed as a check valve is interposed in a passage 23 between the liquid input port 21 of the modulator 20 and a liquid output port 22 thereof. This valve device 24 is adapted to be opened by a push-rod connected to a hydraulic piston 30 having a small diameter fitted in the modulator 20, as the piston 30 advances. In addition, the liquid output port 22 of the modulator 20 is communicated with a hydraulic chamber 31 and is connected to a wheel cylinder 26.

A second air pressure line 40 connected to a pneumatic chamber 34 of the modulator 20 is connected to the first air pressure line 4, and the pneumatic chamber 34 is thereby connected to the brake valve 2. A hold valve 41 is inserted in this second air pressure line 40, and the pneumatic chamber 34 is connected to an external part via a decay valve 42.

A two-way check valve 45 is provided in the second air pressure line 40 between the hold valve 41 and the brake valve 2. This two-way check valve 45 comprises an exhaustside check valve 46 which is urged by an exhaust valve spring 47 and is adapted to allow only the exhaust air to pass therethrough and an air supply-side check valve 48 which is urged by an air supply valve spring 49 and is adapted to allow only the supply air to pass therethrough. An input-side port 45A of this two-way check valve 45 is connected to the first air pressure line 4, while an output-side port 45B thereof is connected to the hold valve 41.

The check pressure $F_1/A$ of the air supply-side check valve 48 caused by an urging force $F_1$ of this air supply valve spring 49 is preferably set to be as small as possible insofar as the air supply-side check valve 48 has a checking function.

Meanwhile, the check pressure $F_2/B$ of the exhaust-side check valve 46 caused by an urging force $F_2$ of the exhaust valve spring 47, i.e., the residual pressure within the pneumatic chamber 34 or the like of the modulator 20 due to the compressed air, is set to a level close to the pressure which causes the locking of the wheels on a road surface having a low coefficient of friction. In addition, the check pressure $F_2/B$ is larger than the check pressure $F_1/A$.

The reason for this is as follows: When braking is performed on a road surface having a low coefficient of friction in a state in which the pressure within the pneumatic chamber 13 of the air master cylinder 10 is low, if the residual pressure within the pneumatic chamber 34 of the modulator 20 is high, even if the decay valve 42 is opened by a pressure reducing signal during an anti-lock control operation to start a pressure drop for the pneumatic chamber 34 of the modulator 20, the pneumatic piston 33 of the modulator 20 does not retract until the pressure of the pneumatic chamber 34 of the modulator 20 becomes lower than the pressure of the pneumatic chamber 13 of the air master cylinder 10, thereby causing a delay in the pressure drop for the hydraulic chamber 31 of the modulator 20.

Accordingly, in order to reduce this delay, it is preferable to set the residual pressure of the pneumatic chamber 34 of the modulator 20 at a low level which is close to the pressure which causes the locking of the wheels on a road surface having a low coefficient of friction.

In addition, the ratio between the sectional area of the pneumatic piston 11 of the air master cylinder 10 and the sectional area of the hydraulic piston 12 thereof is set to be identical with the ratio between the sectional area of the pneumatic piston 33 of the modulator 20 and the sectional area of the hydraulic piston 30 thereof.

Figure 5:
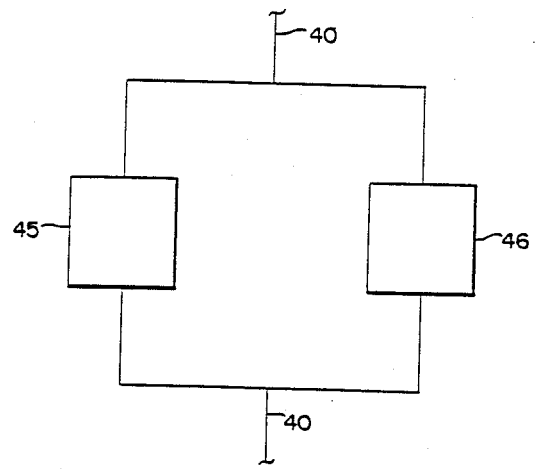
FIG. 5 is a schematic diagram of an alternate form of two way check valve arrangement.

Although, in the above-described embodiment, the exhaust-side check valve 46 and the air supply-side check valve 48 are formed integrally to form the two-way check valve 45, the former being disposed in a central portion and the latter around an outer peripheral portion thereof, it is also possible to separate the exhaust-side check valve 46 and the air supply-side check valve 48 and arrange them in parallel, as illustrated in FIG. 5.

This two-way check valve 45 may be alternatively disposed in the second air pressure line 40 on the outlet side (the modulator 20 side) of the hold valve 41.

A description will now be given of the operation. When a brake pedal 3 is pressed to open the brake valve 2, the compressed air of the air pressure source 1 formed as an air tank is introduced into the pneumatic chamber 13 of the air master cylinder 10 via the first air pressure line 4, thereby pushing the pneumatic piston 11. For this reason, the hydraulic piston 12 reduces the volume of the hydraulic chamber 14 to feed a compressed fluid to the hydraulic pressure line 15. Meanwhile, the compressed air which has passed through the brake valve 2 is supplied to the pneumatic chamber 34 of the modulator 20 via the air supply-side check valve 48 of the two-way check valve 45 and the hold valve 41, thereby pushing the pneumatic piston 33. In consequence, the hydraulic piston 30 connected to the pneumatic piston 33 holds the valve device 24 in the open position, with the result that the hydraulic pressure of the hydraulic line 15 is introduced into the wheel cylinder 26 through the passage 23, applying brakes to the wheels.

If the wheels are about to be locked, the hold valve 41 is closed by a command of an electronic control unit (not shown), thereby holding the pressure of the pneumatic chamber 34 at a fixed level. Furthermore, if the hydraulic pressure of the hydraulic chamber 14 of the air master cylinder 10 rises, the hydraulic pressure of the hydraulic chamber 31 of the modulator 20 also rises. As a result, the hydraulic piston 30 is retracted, thereby closing the valve device 24 and shutting off the passage 23.

In addition, if the decay valve 42 is opened by a command, the compressed air of the pneumatic chamber 34 of the modulator 20 is exhausted and the pressure consequently declines, which also closes the valve device 24. If the hydraulic piston 30 further retracts, the hydraulic chamber 31 expands, which results in a decline in the hydraulic pressure of the hydraulic chamber 31, thereby preventing the wheels from locking. If the possibility of the locking of the wheels is overcome, the decay valve 42 is closed, and if more powerful braking is required, the hold valve 41 is opened.

Next, if the brake pedal 3 is released, and the brake valve 2 is thereby closed and the first air pressure line 4 is shut off from the air pressure source 1, the valve (not shown) provided in parallel with the brake valve 2 opens, allowing the first air pressure line 4 to be vented to the atmosphere.

At that time, the compressed air in the first air pressure line 4 and the pneumatic chamber 14 of the air master cylinder 10 is released to the atmosphere. In addition, the compressed air inside the pneumatic chamber 34 of the modulator 20 and the second air pressure line 40 between the pneumatic chamber 34 and the exhaust-side check valve 46 of the two-way check valve 45, i.e., the second air pressure line 40 on the pneumatic chamber 34 side, is also released as the exhaust-side check valve 46 is pushed open. Subsequently, when the pressure within the second air pressure line 40 on the pneumatic chamber 34 side reaches a check pressure set in the exhaust-side check valve 46, the exhaust-side check valve 46 closes, and the compressed air of the check pressure remains in the pneumatic chamber 34 and the second air pressure line 40 on the pneumatic chamber 34 side, so that the amount of air released becomes smaller by the portion of that residual pressure.

If the brake valve 2 is opened again, the compressed air is supplied to the pneumatic chamber 13 of the air master cylinder 10 through the first air pressure line 4, and the compressed air which is higher than the check pressure opens the air supply-side check valve 48 to supply the compressed air to the second air pressure line 40 on the pneumatic chamber 34 side and the pneumatic chamber 34 of the modulator 20. In this case, however, since the residual pressure remains in the pneumatic chamber 34 and the second air pressure line 40 on the pneumatic chamber 34 side due to the residual compressed air, so that the amount of air supplied can be smaller by that portion.

In accordance with the present invention, since the residual pressure is held in the pneumatic chamber 34 of the modulator 20 and the second air pressure line 40 from the pneumatic chamber 34 to the two-way check valve 45, the supply of the compressed air can be dispensed with by the portion of that residual pressure during the braking of the wheels, so that the pressure rising rate can be accelerated by that portion.

In addition, at the time of the release of braking, the amount of compressed air exhausted becomes smaller by the portion of the residual pressure, so that the pressure reducing rate can be accelerated, and the amount of compressed air consumed becomes smaller.

Furthermore, it is possible to overcome the drawback that, during an early period of pressurization when it is necessary to apply sudden brakes to the wheels, the supply of air to the pneumatic chamber 34 of the modulator lags behind the supply of air to the air master cylinder 10, so that the hydraulic pressing force against the hydraulic piston 30 on the air master cylinder 10 side becomes smaller than the pneumatic pressing force against the pneumatic piston 33 on the modulator 20 side, which causes the hydraulic piston 30 of the modulator 20 to retract, closing the valve device 24.

What is claimed is:

1. An anti-lock control apparatus for an air over hydraulic brake system wherein a brake valve is connected to an air pressure source, said brake valve is connected to a pneumatic chamber of an air master cylinder through a first air pressure line, a hydraulic chamber of said air master cylinder is connected to a liquid input port of a modulator, a valve device is interposed in a passage between said liquid input port of the modulator and a liquid output port thereof, said valve device is arranged such as to be capable of being opened by a hydraulic piston fitted in the modulator, a pneumatic piston is connected to said hydraulic piston, and said liquid output port of said modulator is communicated with a hydraulic chamber of said modulator and is connected to a wheel cylinder, a pneumatic chamber of said modulator is connected to the brake valve via a second air pressure line, and air pressure in said modulator pneumatic chamber is controlled by a first valve apparatus, said anti-lock control apparatus for an air over hydraulic brake system comprising: a second valve apparatus provided to leave a prescribed amount of residual pressure in said modulator pneumatic chamber at the time of the release of braking.

2. An anti-lock control apparatus for an air over hydraulic brake system according to claim 1, wherein said second valve apparatus is an exhaust-side check valve which exhausts air from said pneumatic chamber to the brake valve.

3. An anti-lock control apparatus for an air over hydraulic brake system according to claim 2, further comprising an air supply-side check valve to supply air to said pneumatic chamber.

4. An anti-lock control apparatus for an air over hydraulic brake according to claim 3, wherein said exhaust-side check valve and said air supply-side check valve are formed integrally, the former being disposed in a central part and the latter being disposed about an outer peripheral portion of the former.

5. An anti-lock control apparatus for an air over hydraulic brake system according to claim 3, wherein said exhaust-side check valve and said air supply-side check valve are formed separately from each other and are arranged in parallel with each other.

6. An anti-lock control apparatus for an air over hydraulic brake system according to claim 3, wherein said exhaust-side check valve and said air supply-side check valve are provided in said second air pressure line between said brake valve and said first valve.

7. An anti-lock control apparatus for an air over hydraulic brake system according to claim 3, wherein said exhaust-side check valve and said air supply-side check valve are provided in said second air pressure line between said first valve and said modulator.

8. An anti-lock control apparatus for an air over hydraulic brake system according to claim 3, wherein the check pressure of said exhaust-side valve is greater than the check pressure of said air supply-side check valve.

* * * * *